June 14, 1966 SHINICHIRO OGAWA ETAL 3,256,448
PROTECTION CIRCUIT OF A TRANSISTOR TYPE DIRECT CURRENT CONSTANT VOLTAGE DEVICE
Filed Sept. 20, 1963
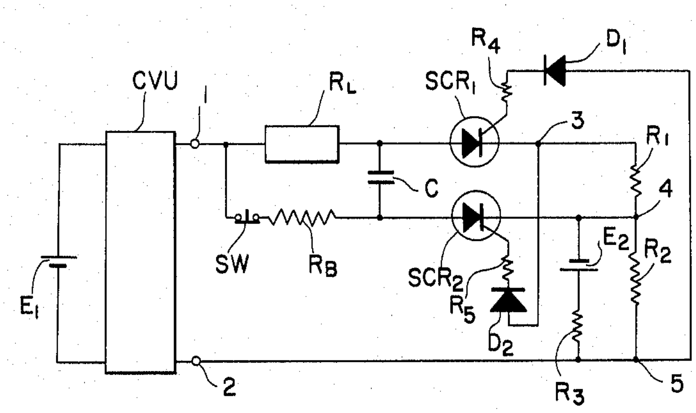
INVENTORS
SHINICHIRO OGAWA
KIYOTOMO NAGAMATSU
BY
Arthur H. Swenson 3,256,448

PROTECTION CIRCUIT OF A TRANSISTOR TYPE DIRECT CURRENT CONSTANT VOLTAGE DEVICE

Shinichiro Ogawa and Kiyotomo Nagamatsu, Tokyo, Japan, assignors to Honeywell Inc., a corporation of Delaware Filed Sept. 20, 1963, Ser. No. 310,266
Claims priority, application Japan, Sept. 24, 1962, 37/40,982
1 Claim. (Cl. 307—88.5)

This invention relates to a circuit protecting a transistor type direct current constant voltage device from an overcurrent by using a silicon controlled rectifier. In general, a short circuit of a load circuit and an overcurrent generated by an error of connection of a load exert significant ill influences on a transistor type constant voltage device.

The object of the present invention is to provide a novel protection circuit in which an overcurrent is cut off from a load circuit instantaneously and automatically and said status is maintained unless a push-button switch S.W. on the output side of the transistor type direct current constant voltage device is pushed.

The object and advantage of this invention will become readily apparent from the following detailed description, in which:

The drawing is a view showing one embodiment of a protection circuit in accordance with this invention.

In the drawing, CVU is a transistor type direct current constant voltage device and $E_1$ is a supply electric power source of said transistor type direct current constant voltage device CVU.

To positive terminal 1 on the output side of said transistor type direct current constant voltage device CVU, a load circuit in which a silicon control rectifier $SCR_1$ is serially connected to a load RL and a by-pass circuit in which a silicon control rectifier $SCR_2$ is connected serially to a by-pass resistor RB of the load are connected. An overcurrent detection circuit is inserted between said two circuits and the negative terminal on the output side of the transistor type direct current constant voltage device CVU consist of a voltage detection resistor $R_1$ for gating $SCR_2$ connected to the negative pole of $SCR_1$ and a voltage detection circuit for gating $SCR_1$ which is connected serially to a resistor $R_1$ and to the negative pole of $SCR_2$ at point 4, and said voltage detection circuit for gating said $SCR_1$ consists of connecting a resistor $R_3$ to the positive terminal of a reference electric power source $E_2$ and by connecting parallelly a resistor $R_2$ thereto.

The connection point 5 of said resistor $R_2$ and said resistor $R_3$ is connected to the negative terminal 2 on the output side of the transistor type direct current constant voltage device CVU and the gate circuit of $SCR_1$, and the gate circuit of said $SCR_1$ consists of by connecting serially a gate protection resistor $R_4$ and a silicon diode $D_1$. The gate circuit of $SCR_2$ consists of a gate protection resistor $R_5$ and a silicon diode $D_2$ and is connected to the negative terminal 3 of $SCR_1$. C is a condenser; it is inserted between the anodes of $SCR_1$ and $SCR_2$ and assists the ignition of a gate of $SCR_2$.

Next, we will explain the operation of the protection circuit of a transistor type direct current constant voltage device in accordance with the present invention.

Supposing the electric current generated in the closed circuit formed by resistor $R_2$, resistor $R_3$ and reference electric current source $E_2$, by only said reference electric current source $E_2$ is $I_3$, the voltage $V_2$ between points 4 and 5 will be as follows:

$$V_2=I_3R_2$$

If said voltage $V_2$ is a sufficient value to ignite $SCR_1$, since a voltage is being applied to the gate circuit of $SCR_1$ in the conducting direction, $SCR_1$ is ignited and a load electric current $I_1$ flows.

Said load electric current $I_1$ flows through resistor $R_1$, resistor $R_2$, reference electric power source $E_2$ and resistor $R_3$ to the negative terminal on the output side of the transistor type direct current constant voltage device CVU.

Accordingly, due to said load electric current $I_1$, the voltage $V_1$ between the points 3 and 4 will have a value obtained by multiplying the sum of said load electric current $I_1$ and the gate electric current of $SCR_1$ by the resistor $R_1$, and the voltage $V_2$ between the points 4 and 5 will be as follows:

$$V_2=\left(I_3-\frac{R_3}{R_2+R_3}I_1\right)R_2$$

If said load electric current $I_1$ increases, the voltage $V_2$ between the points 4 and 5 will further drop, and if said load electric current $I_1$ exceeds.

$$\left(1+\frac{R_2}{R_3}\right)$$

$I_3$, $V_2$ will become a negative voltage as the polarity reverses, and an extinction voltage of arc will be sent into the gate of $SCR_1$.

On that occasion, the voltage $V_1$ between the points 3 and 4 will become nearly equal to the product of said load electric current $I_1$ times said resistor $R_1$. If said load electric current $I_1$ increases further and reaches the largest rated load electric current $I_{10}$, the voltage $V_1$ between the points 3 and 4 will become as follows:

$$V_1=I_{10}R_1$$

If a resistor $R_1$ is chosen in such manner that said voltage will become equal to an igniting voltage of arc of $SCR_2$, since a voltage in the conductive direction is being sent into the gate circuit of $SCR_2$, it will be ignited instantaneously, the by-pass circuit will be made conductive and a by-pass electric current $I_2$, which is a little smaller than the largest load electric current will flow. In that instance, since an extinction voltage of arc is being sent to $SCR_1$, it will be assisted by condenser C and will extinct immediately and cut off the load circuit.

Like this, if said load electric current $I_1$ reaches the largest load electric current $I_{10}$, $SCR_2$ will instantaneously ignite and complete the by-pass circuit, extinct $SCR_1$ and cut off the load circuit, but, when this status is attained, the gate circuit of $SCR_1$ is held in a negative voltage and will not be ignited again.

Also, though the gate voltage $V_2$ of $SCR_2$ will almost become to be a zero voltage, as long as $SCR_1$ does not ignite, $SCR_2$ will never be extincted due to the operation of the condenser C and the characteristics of the silicon control rectifier.

Accordingly, as long as the transistor type direct current constant voltage device CVU is not cut off, it will never be switched from a by-pass circuit to a load circuit.

Incidentally, though it is desirable that a by-pass electric current $I_2$ is equal to the largest rated load electric current $I_{10}$, as far as the characteristics of a silicon control rectifier permits, it is economical that a by-pass electric current $I_2$ is smaller than the largest load electric current $I_{10}$.

As mentioned above, since the protection circuit of the transistor type direct current constant voltage device in accordance with the present invention will, if an overload electric current flows into a load circuit, cut off instantaneously the load electric current of the load circuit and switches to a by-pass circuit, it will protect safely the transistor type direct current constant voltage device from an overload electric current generated by a short-circuit or an error of connection of load.

While a preferred embodiment of the present invention is disclosed, it is recognized that the scope of the present invention is not limited thereto and it is therefore intended that the scope of the present invention be defined by the scope of the appended claim.

What is claimed is:

A circuit for protecting a source of supply voltage from excessive current flow comprising a pair of terminals arranged to be connected to the output of the voltage source, a load circuit including a load device, a first silicon controlled rectifier, and first and second resistors connected in series between said terminals, a by-pass circuit including a by-pass resistor, a second silicon controlled rectifier, and said second resistor connected in series between said terminals, a first gate circuit including a first diode connecting said first and second resistors between the gate and cathode of said first rectifier, a source of reference voltage connected in parallel with said second resistor and poled to apply a turn-on voltage to said first rectifier by way of said first gate circuit to render said first rectifier conductive to permit current to flow in said load circuit between said terminals, said first and second resistors being so connected as to apply a turn-off voltage to said first rectifier by way of said first gate circuit when the value of the current flowing in said load circuit exceeds a predetermined value, and a second gate circuit including a second diode connecting said first resistor between the gate and cathode of said second rectifier to apply thereto a turn-on voltage to render said second rectifier conductive when said current value exceeds said predetermined value, the conduction of said second rectifier cooperating with said turn-off voltage to render said first rectifier non-conductive to reduce the flow of current between said terminals.

References Cited by the Examiner

UNITED STATES PATENTS 3,040,270 6/1962 Gutzwiller ------ 307—88.5 X

ARTHUR GAUSS, *Primary Examiner.*

M. LEE, *Assistant Examiner.*